United States Patent [19]

Ackeret

[11] E Patent Number: Re. 32,766

[45] Reissued Date of Patent: Oct. 18, 1988

[54] PICTURE VIEWER

[75] Inventor: Peter Ackeret, Kusnacht, Switzerland

[73] Assignee: Licinvest AG, Chur, Switzerland

[21] Appl. No.: 876,749

[22] Filed: Jun. 20, 1986

Related U.S. Patent Documents

Reissue of:

[64] Patent No.: 4,245,417
Issued: Jan. 20, 1981
Appl. No.: 943,366
Filed: Sep. 18, 1978

[30] Foreign Application Priority Data

Sep. 20, 1977 [DE] Fed. Rep. of Germany ..... 2742349

[51] Int. Cl.[4] ..... G09F 11/30

[52] U.S. Cl. ..... 40/513; 40/490; 40/511

[58] Field of Search ..... 40/511, 513, 490

[56] References Cited

U.S. PATENT DOCUMENTS

| | | | |
|---|---|---|---|
| 535,635 | 3/1895 | Stone | 40/511 |
| 3,377,727 | 4/1968 | Weggeland | 40/511 |
| 3,495,345 | 2/1970 | Weggeland | 40/511 |
| 3,696,537 | 10/1972 | Alleman | 40/511 |
| 3,783,540 | 1/1974 | Barclay | 40/511 |
| 3,878,632 | 4/1975 | Berggren et al. | 40/152 |
| 4,057,920 | 11/1977 | Weggeland | 40/511 |
| 4,242,817 | 1/1981 | Ballard | 40/152.1 |
| 4,242,820 | 1/1981 | Ackeret | 40/490 |
| 4,245,417 | 1/1981 | Ackeret | 40/513 |

FOREIGN PATENT DOCUMENTS

| | | |
|---|---|---|
| 179675 | 12/1906 | Fed. Rep. of Germany . |
| 224700 | 7/1910 | Fed. Rep. of Germany . |
| 873908 | 7/1952 | Fed. Rep. of Germany . |
| 1772198 | 1/1971 | Fed. Rep. of Germany . |
| 2212135 | 11/1972 | Fed. Rep. of Germany . |
| 2123257 | 9/1972 | France . |
| 2265116 | 10/1975 | France . |

*Primary Examiner*—Gene Mancene
*Assistant Examiner*—Wenceslao J. Contreras
*Attorney, Agent, or Firm*—Robert R. Jackson

[57] ABSTRACT

A picture viewer having a housing to confine a pile of pictures, a slider to be withdrawn and returned to the housing, a viewing window, a pressure plate confronting the window, springs urging the plate toward the window, a retention strip to engage and strip off the picture at the end of the pile upon withdrawal of the slides, a separator strip to retain the pile as the one picture is stripped off, a slidable button on the housing to disable the springs and draw the plate away from the window, and a confining ledge on the slider also drawing the plate away from the window and independently of the slidable button.

23 Claims, 18 Drawing Sheets

1
1
100
102
104
106
108
110
112
114
116
118
120
122
126
128
130
136
138
144
148
150

100
110
112
114
120
122
126
128
130
136
144
148
150
152
152'

100
110
112
114
116
120
126
128
130
132
134
138
140
142
146
148
150
154
156
170
172

100
106
110
112
114
120
128
130
132
134
138
140
142
146
148
150
152
18

Fig. 30a
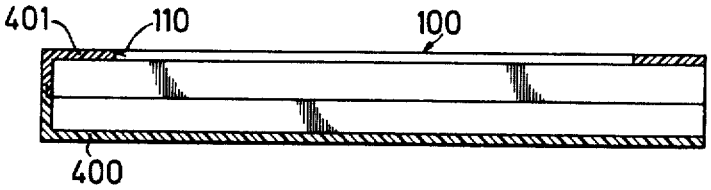
Fig. 30b
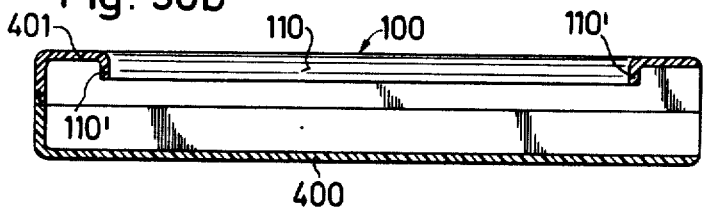
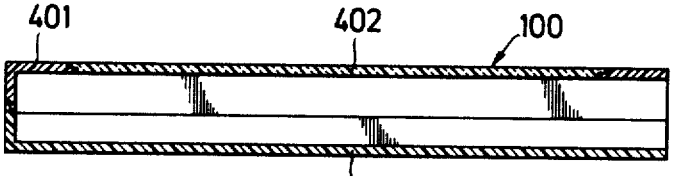
Fig. 31

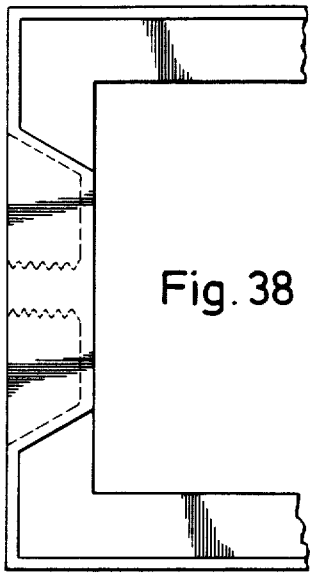
Fig. 38
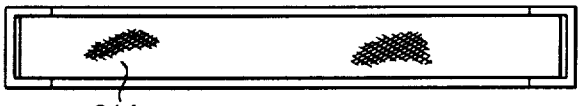
Fig. 39
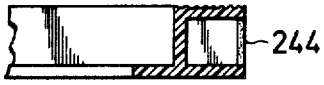
Fig. 40
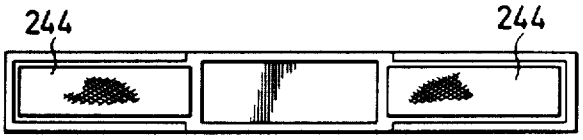
Fig. 41
Fig. 42
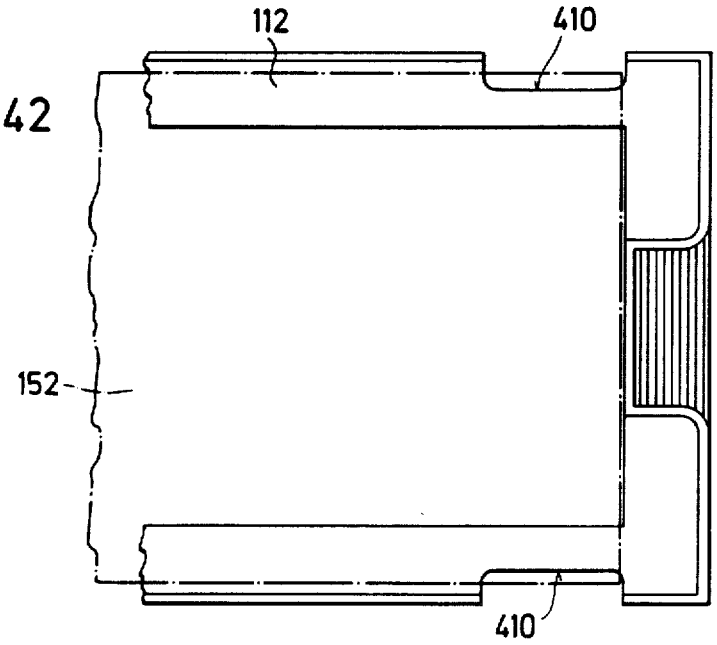

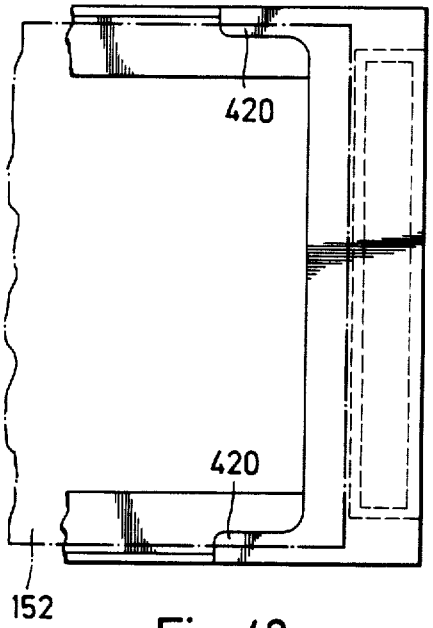
Fig. 48
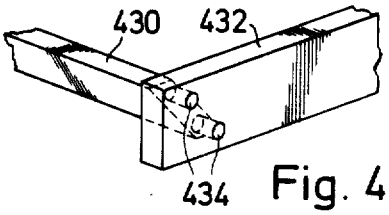
Fig. 49
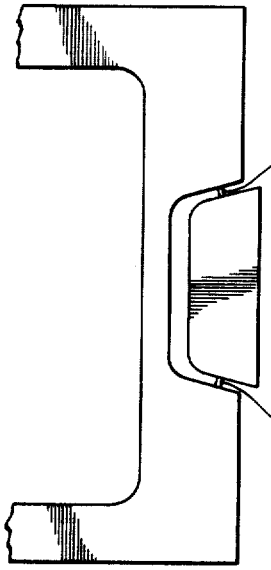
Fig. 50
Fig. 51
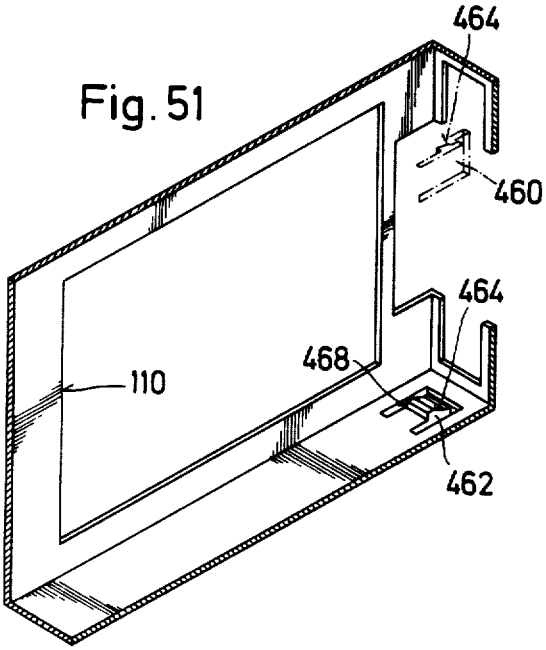
Fig. 52a
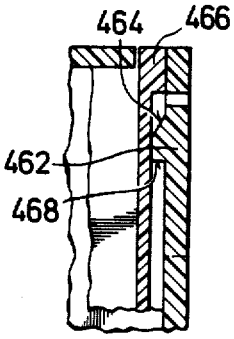
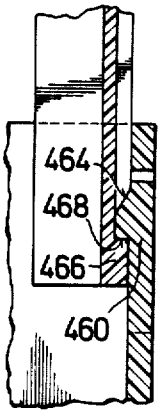
Fig. 52b
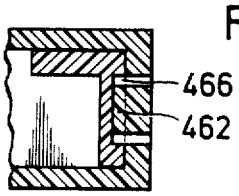
Fig. 52c

PICTURE VIEWER

Matter enclosed in heavy brackets [ ] appears in the original patent but forms no part of this reissue specification; matter printed in italics indicates the additions made by reissue.

The invention relates to a picture viewer.

BACKGROUND OF THE INVENTION

A picture viewer for paper pictures is found in German Auslegeschrift No. 22 12 135 and for (unexposed) photographic plates in German Auslegeschrift No. 224 700 to German Patent Specification No. 179 675.

Such devices are intended to present to an observer (or to a camera) the viewing side or the exposure side of a pile of picture or plates. After the viewing of illumination, the picture just viewed in pushed laterally away from the pile and pushed under the pile again on the other side of the pile. For this purpose the known devices have, basically, the following co-operating elements:

The pile—in the following reference is made only to a pile of pictures, although the principle applies equally to plates—is located in a housing having a viewing aperture which may be glazed. One narrow side of the housing is open, and through the aperture, between limit stops, a slider member may be moved such that when it is pulled out it takes with it by means of a transporter the picture arranged facing the viewing window. In this operation the picture concerned is guided over a member referred to here and hereinafter as a separator, by which a transverse bar is to be understood, which, near to the housing aperture for the slider member, leaves open only at the top and the bottom a slot for the picture to pass through. The transporter of the slider member, which is constructed like a hook, therefore takes with it only this one picture, whilst the remainder of the pile lies adjacent to the separator. During the return stroke of the slider member, or as it is re-inserted, the picture pulled away through the upper slot is pushed back again through the lower slot and in so doing goes under the pile. A pressure arrangement using a spring holds the pile and, in particular, the uppermost picture, against the viewing aperture.

In the known devices the entire housing is therefore closed on all sides with the exception of the viewing aperture—which is designed to be smaller than the pictures—and the separator slots and passages for the slider member already mentioned, so that to insert or remove a pile of pictures additional measures are necessary.

In the two known constructions mentioned first, the housing base may be detachable or may be hinged back, and in the last construction mentioned the housing has a closable insertion aperture on the narrow side opposite the slider member. In a further known construction according to German Patent Specification No. 873 908 (which otherwise belongs to the type described) not only is one such a lateral aperture provided, but it is arranged that an entire magazine of pictures can be exchanged.

These means for inserting or removing a pile are not only expensive but also complicated to handle.

SUMMARY OF THE INVENTION

It is the task of the invention to provide a device in which the removal and the insertion of a pile is effected by means of the change-over slider member in such a manner that an additional aperture in the housing and corresponding lid or magazine parts can be dispensed with.

In this solution, the mounting of an additional component is avoided and the user has no trouble handling the device because the changing of pictures and the exchange of the pile is effected by means of the same operating element and at the same place.

When, as with the previously known devices, the separator is arranged in the housing and the transporter is arranged on the slider member, a disabling arrangement, which may be externally operated, ensures that, on its operation or in its operative position, the separator is pivoted away, pulled away, folded up or rendered ineffective in some other manner, while the slider member takes with it not only one (the uppermost or the bottom-most) picture but all the pictures of the pile, the transporter or an additional element in that case acting on the whole pile.

With such a construction the change of the pictures is to some extent simulated as if carried out manually: one picture is removed and placed beneath the pile. However, the solution of the invention is easier to obtain by a different concept in which the change of pictures is effected such that the slider member takes with it and re-inserts the entire pile with the exception of one picture which is held in the housing. The change-over mechanism can then be disabled in a much simpler manner to allow the removal of the entire pile than is the case with the conventional concept, because the disabling affects only the transporter (which in this case, in fact, is more of a "retaining element"), whereas the separator takes with it the entire pile without further engagement.

As a result, the uppermost or the bottom-most picture of the pile is able to remain in the housing. When, as customary, a spring pressure arrangement is provided which presses the pile against the viewing window and holds the picture in engagement with the transporter, then the disabling can be carried out by rendering the spring pressure ineffective and thus also the operative connection between the transporter and the picture; of course, the transporter can also be disengaged in a different manner. In this operation the transporter may be constructed as a hook, which is, however, not suitable when the pictures are thin and not planar, but possibly unforeseeably curved. If, on the other hand, a high friction or retentive covering enabling surface engagement with the picturess is used as the transporter, for instance a commercially available plastics material having a surface molecular structure to which fairly smooth-surfaced articles cling firmly without sticking, then such a retentive or adhesive covering may be provided on the pressure arrangement and together with this can disable the transporter in a single operation. In this case it is sufficient to withdraw the retentive covering to a point below the surface of the bottom-most picture, and in a further development of the invention the means provided for this purpose may be allowed to act additionally also, in principle, during every return stroke of the slider member, that is to say, during the picture change operation, so that the retentive covering does not hinder the reinsertion of the pile.

If, however, the retentive covering lies on the side of the pile turned away from the pressure arrangement, then on the widthdrawal of the pressure arrangement a picture still clinging to the retentive covering for instance can be pushed off by means of a weak counter-spring or the like.

The device may be provided with further modifications alternatively or in combination, in order to improve its use.

These modifications include a pliable support at the back face, means to hang the device as a frame, interchangeable additional frames to be fastened by some means at the front face and having different shapes and surface treatments, the biasing of the slider by means of a spring into its fully opened or fully closed position, the division of the housing wall comprising the window into a multiplicity of windows each one related to a pile of pictures, and another one to a pile of text cards, picture and text eventually being disposed on a common information carrier. Further, the window wall of the housing may be provided with spaces to permit a user to make notes thereon.

Further, there is the possibility to provide a space within the device, preferably stationary within the housing, to store, e.g., the negative belonging to the photo negative disposed in the slider. Finally, the device may be provided at its front and on its rear face with a window each in which case, of course, two different sliders are mounted in parallel.

Further details are defined in the sub-claims and their significance will become apparent from the following explanation of examples of embodiments.

DESCRIPTION OF THE DRAWINGS

FIGS. 21 to 26 illustrate a second embodiment in which the transporter is arranged on the slider member, the separator is arranged on the housing and may be moved away for the withdrawal of the pile, wherein FIG. 21-23 are longitudinal section views of the device in different stages of operation. FIG. 24 is an enlarged detail section view similar to a portion of FIG. 21. FIG. 25 is a somewhat diagrammatic transverse section view and illustrates the pivoting separator in the changeover position at the left half of the view and in the withdrawal position at the right half of the picture; and FIG. 26 is a somewhat diagrammatic longitudinal section view of a modified form of the invention in which the uppermost picture is removed from the housing and for this reason the separator is constructed to act reciprocally, FIGS. 30a, 30b and 31 are longitudinal sections showing various window arrangements, FIGS. 32 to 41 are plan, elevation and section views illustrating the portion that is gripped, in several different embodiments, FIG. 42 is a plan view illustrating a modified means facilitating operation of the slider member, FIGS. 43 to 48 are elevation views illustrating several modified variations of an element holding down a pile of pictures, FIG. 49 is a detail perspective view of a modified form of one possibility of constructing the separator of a material other than the material of the rest of the slider member and the housing, FIG. 50 is a detail plan view of a modified form, FIG. 51 to 52c illustrate certain details useful in the initial assembly of the slider and housing; FIG. 51 is a perspective view with portions broken away for clarity of detail, FIG. 52a is a detail section view showing portions of the slider and housing in assembly; FIG. 52b is a detail section view like 52a, but with the elements shown in shifted position; FIG. 52c is a detail transverse section view of the apparatus illustrated in FIG. 52a.

DETAILED SPECIFICATION

Figure 1:
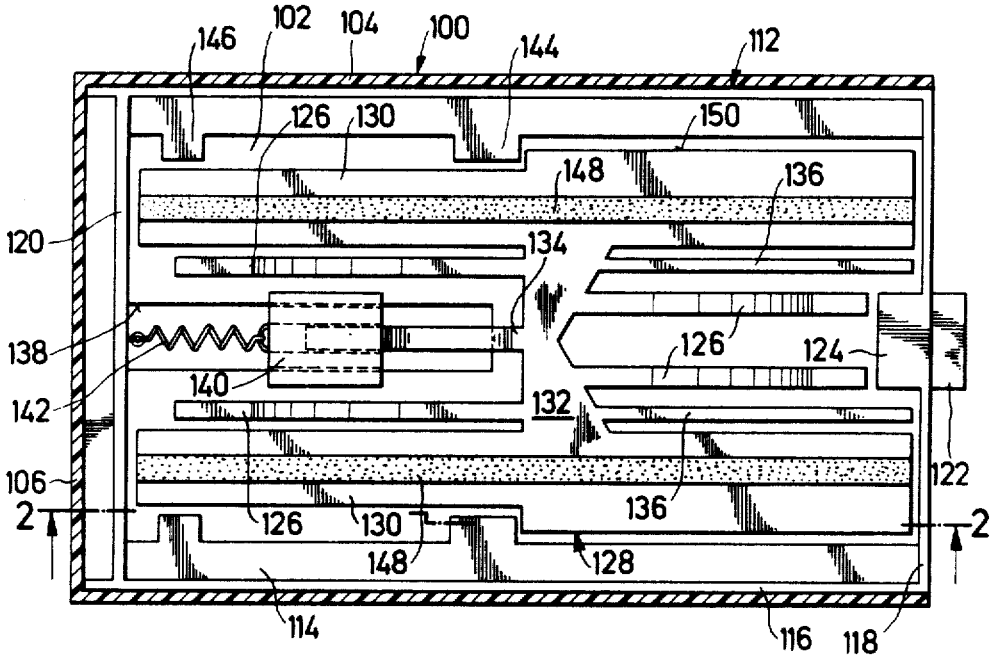
FIG. 1 shows a horizontal sectional view as indicated at 1—1 of FIG. 2.

The housing or frame 100 comprises a base plate 102, side walls 104, a back wall 106 and a lid 108 having a window 110. The slider member 112 movably guided between stops which are constructed in the side walls 104, consists of base bars 114, side bars 116, one front bar 118 and a separator bar or pile transporter 120. A pull 122 for pulling and pushing is shaped on the front bar and a holding-down lug 124, likewise shaped on the front bar, may be recognized.

An individual picture transporter includes a pair of springs 126 biased by arching upwards, one end of each of the springs being anchored in the housing base plate 102 while the other end of each spring is able to execute a restricted sliding movement along the base plate. The springs 126 press against the main liimb 130 of a pressure plate 128 and urge this upwards; as indicated in FIG. 1, the springs 126 are integral with the pressure plate and the arms of the springs 126 facing the back wall 106 are spaced further apart than the arms facing the front bar 118 of the slider member.

The two main limbs 130 of the pressure plate 128 are joined together by a cross member 132 on which a central limb 134 is shaped. Finally, auxiliary limbs 136 extend additionally from the cross member 132. The function of these elements will be explained in detail later.

In the base plate 102 there is formed a guide slot 138 parallel to the direction of movement of the slider member, in which guide a disabling control or button 140 may be moved in a sliding manner. The button 140 is pulled towards the back wall 106 as far as a stop (not shown) by means of a restoring spring 142 and has a central hole into which the central limb 134 of the pressure plate projects in a sliding manner.

Control abutments 144 and 146 are shaped on the lateral bars of the slider member and their function will also be explained later.

On the main limbs 130 of the pressure plate there are finally mounted, e.g. glued, strips 148 of a commercially available plastics material which with only a slight contact pressure exerts an unusually high retentive force.

As will be realized, the pressure plate is intended to hold fast the bottom-most picture of the pile as the slider member is pulled out, while the separator bar takes with it the other pictures. When the slider member is returned, however, the effect of the upward application of pressure by the plate must be considerably reduced. The sequence of operation will be explained first of all with reference to FIGS. 2 to 5, without the pile inserted.

Figures 2, 3, 4, 5:
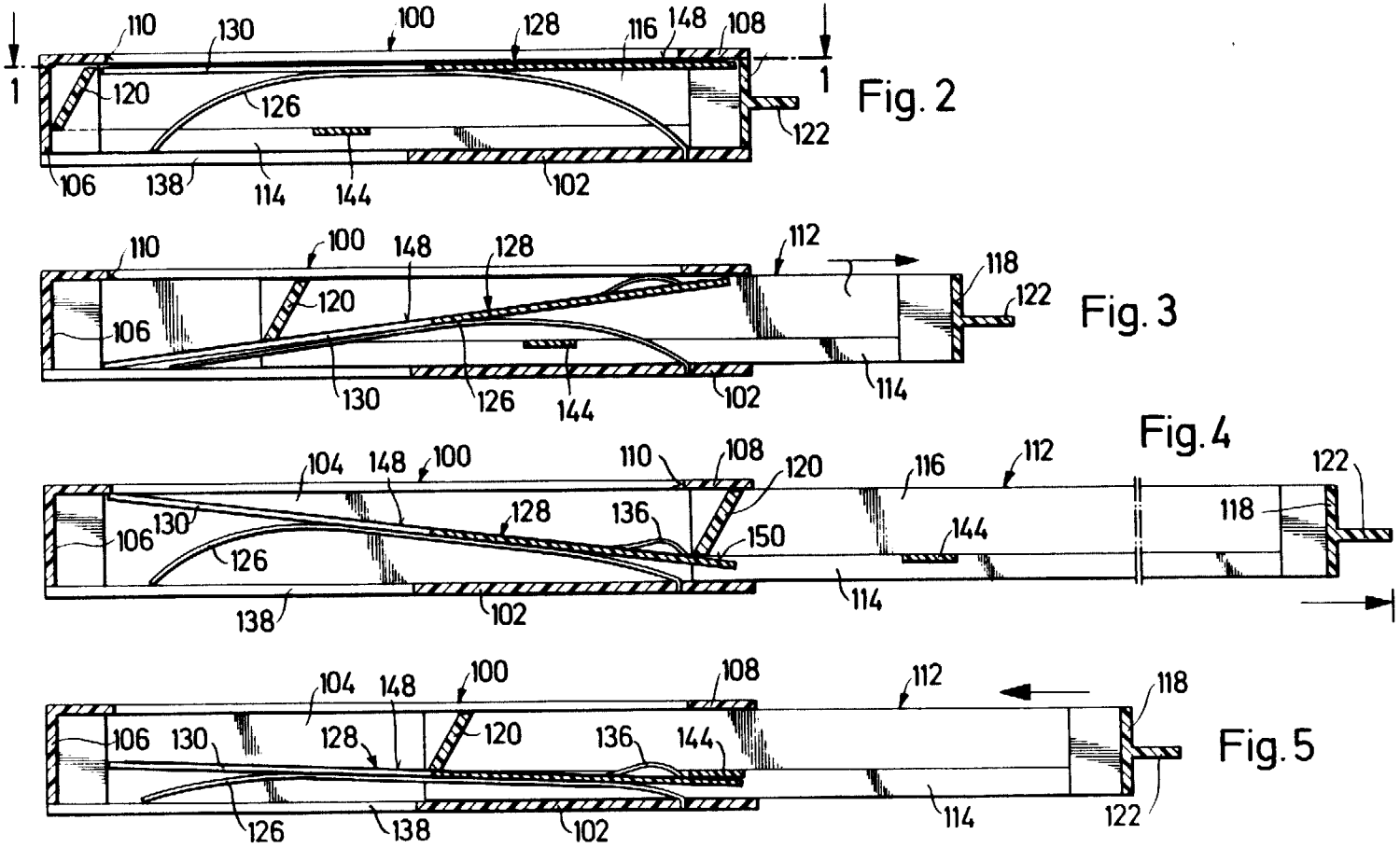
FIGS. 2 to 5 are somewhat diagrammatic longitudinal section views at 2—2 of FIG. 1 and in the several views, showing the parts in different stages of operation.

FIG. 2 shows the initial state. The pressure plate lies under the influence of the springs 126 against the window 110 and the lid 108; the separator bar 120 is located between the pressure plate and the back wall 106. If the slider member 112 is now pulled, then the inclined face of the separator bar presses on the edges of the main limbs 130 that are facing it and these move downwards, as the springs 126 yield. The other end edges of the main limbs are, however, as before, pressed upwards. The control abutment 144 thus dows not strike the control edge 150 of the main limb 130, which takes the form of a lateral extension thereof, because it slides away beneath the abutment 144. In the final position of the slider member (FIG. 4) the separator bar 120 is pressing the front edges of the main limbs 130 downwards, and because of a rocking movement the rearmost edges of the same are correspondingly raised. If the slider member is now pushed in again, then the separator bar presses the pressure plate further down again, but the lowest position of the plate is now near to the front edges, that is to say, nearest the slider member. Therefore, the control abutments 144 now engage over the control edges 150 of the pressure plate and hold this down until the slider member has returned almost to its initial position again where the control elements disengage again and the pressure plate moves rapidly upwards again (cf. FIGS. 1 and 5).

Figures 6, 7, 8, 9:
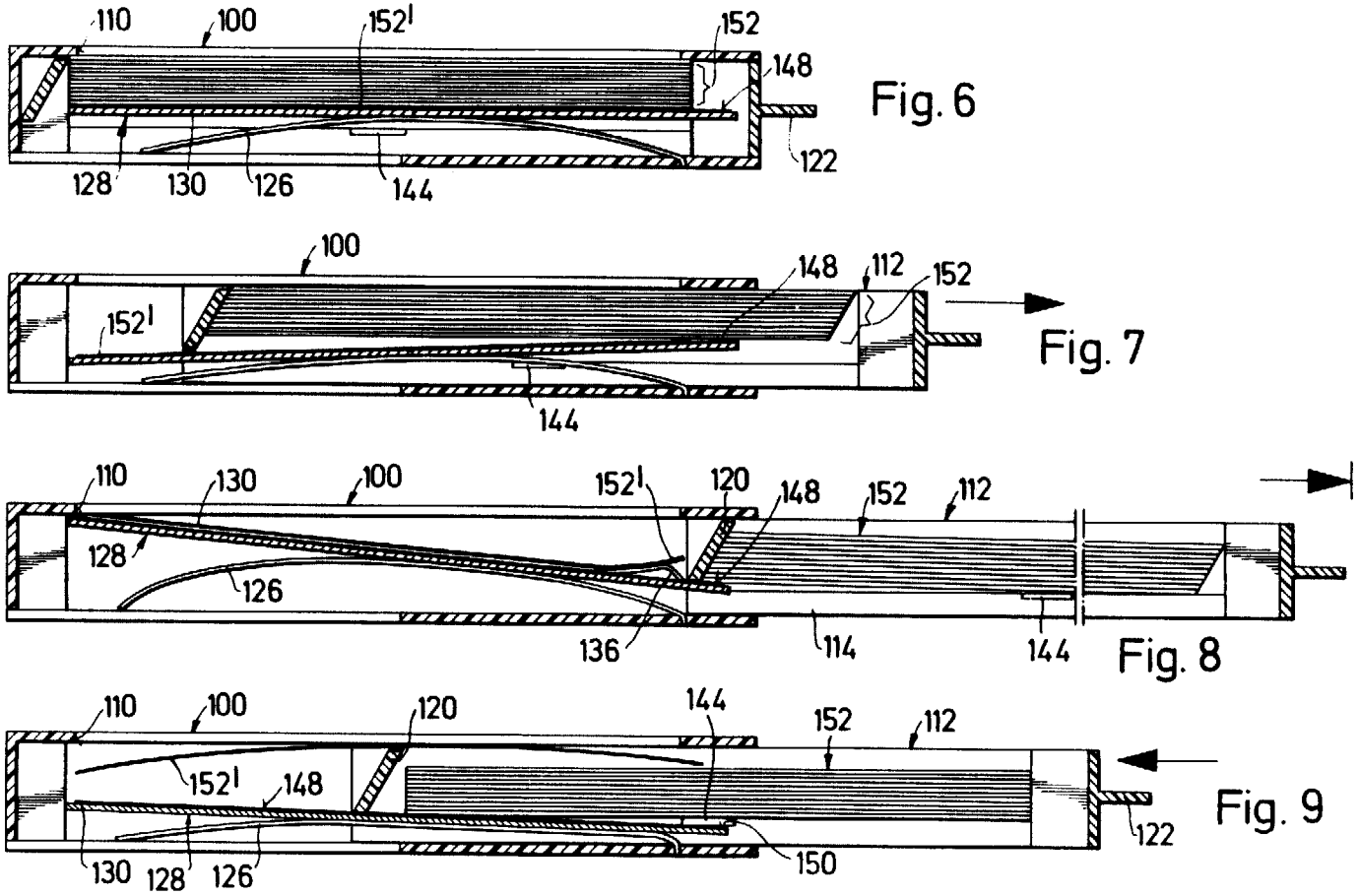
FIGS. 6 to 9 are section views corresponding to FIGS. 2-5, but with a pile of pictures inserted.

The actual picture change sequence proceeds as follows (FIGS. 6 to 9): To begin with the pressure plate is loaded with a pile 152 of, for example, twenty pictures and therefore lies lower down than illustrated in FIG. 2. As the slider member is pulled out, the separator bar takes with it all the pictures of the pile, since the separator bar "sweeps" over the pressure plate. The bottom-most picture 152' however, against which the retentive covering 148 on the main limbs 130 directly presses from below, is held fast by the retentive covering and remains lying on the pressure plate 128. For the rest, the procedure takes place as described above with reference to FIG. 3. Finally, the slider member reaches its end position shown in FIG. 8, in which the pictures 152 fall at the front on to the base bars 114 of the slider member while still lying with their rear edges on the pressure plate. As soon as the separator bar 120 has slid over the ends of the auxiliary limbs 136 that are slightly biased in an upward direction, the picture 152' that has remained behind is pressed upwards a little by these ends at this front edge, so that when the slider member is re-inserted the rear face of the separator bar 120 pushes between the pressure plate and this picture 152' and raises the picture sufficiently far for it to be brought upwards over the upper edge of the separator bar. On further movement of the slider member its separator bar therefore slides below the picture 152' that positions itself in the final position as the uppermost picture on the pile 152. The insertion of the pile is thereby not hindered by the retentive covering 148 since, as mentioned above, the pressure plate is held down by the control elements 144, 150.

Figures 10, 11, 12, 13:
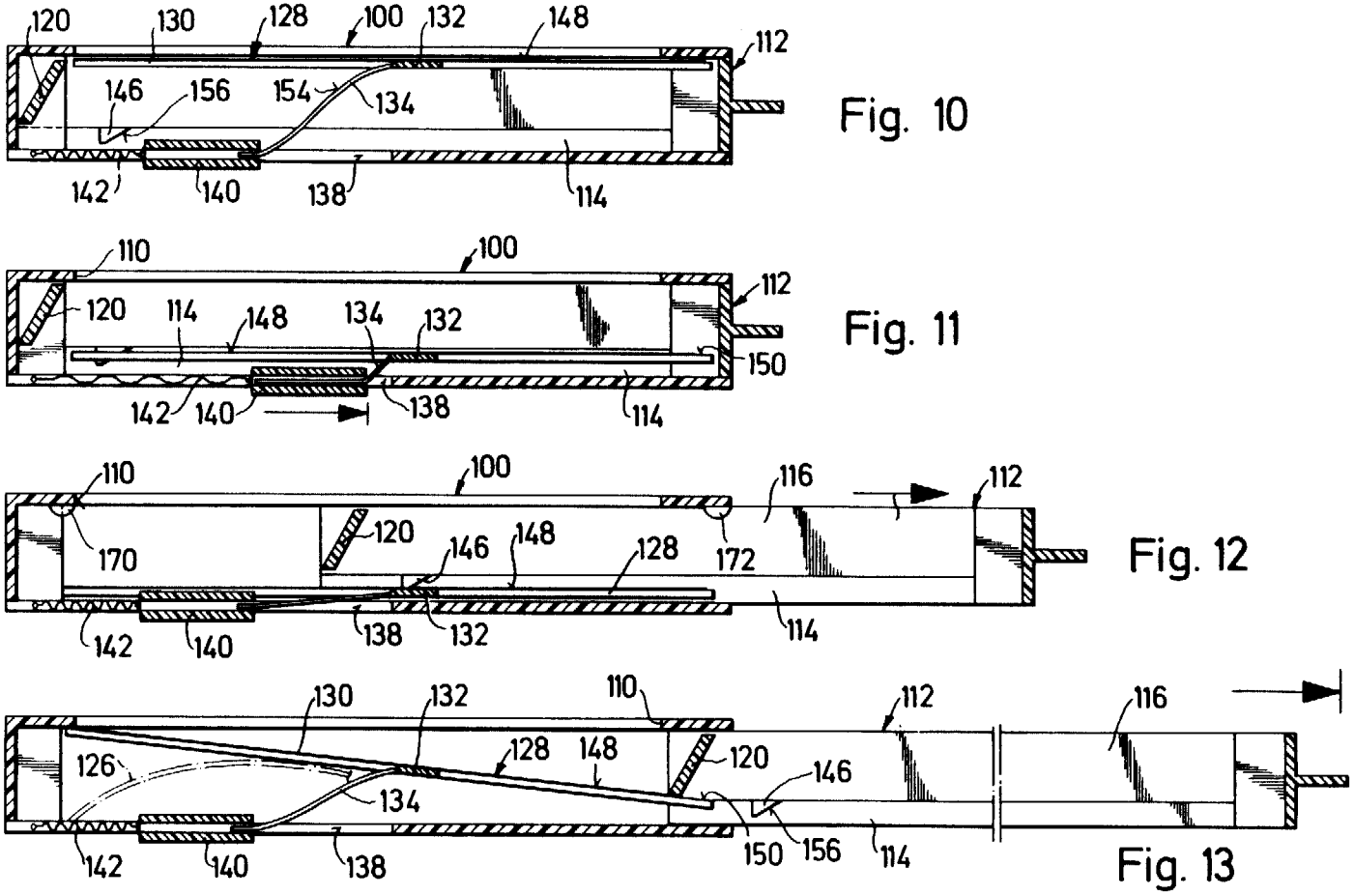
FIGS. 10 to 13 are longitudinal section views at the center of the device and showing the moving parts in different stages of operation.
Figures 14, 15, 16, 17, 18:
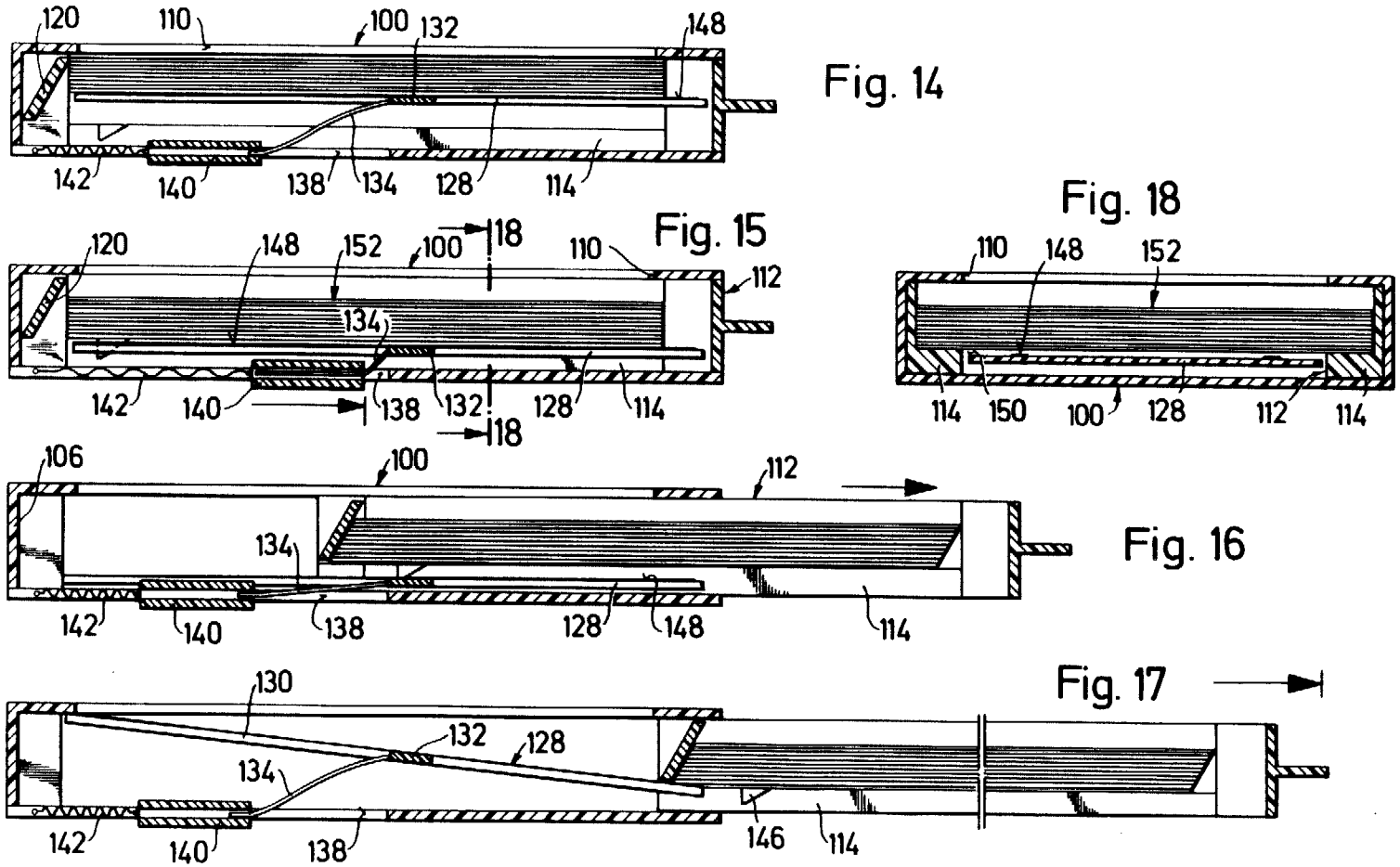
FIGS. 14 to 17 are longitudinal section views corresponding to FIGS. 10-13 with the pile of pictures inserted.
FIG. 18 is a somewhat diagrammatic cross-section view at 18—18 of FIG. 15.

If the entire pile is to be removed, then the button 140 is displaced towards the front. As apparent from FIGS. 10 to 13, the central limb 134 of the pressure plate is downwardly curved so that an S-shape, which is straight when viewed from above, is produced, the lower end of which projects into the button. If the button is displaced out of the position shown in FIG. 10 into the position shown in FIG. 11, then it presses on the upper inclined face 154 of the central limb 134 and pulls the complete pressure plate 128 down against the force of the springs 126, and in fact pulls down until the upper side of the retentive covering 148 is lower than the surface of the base bar 114 of the slider member 112. Thus, when the slider member is pulled out, the entire pile 152 is taken with it, as the pile now lies on the slider member itself. As a result of the biassing of the springs 126 and the friction contact of the central limb 134 in the button 140, the button is not pulled back by the spring 142 which is weak in comparison. However, when the control abutment 146 strikes with its sloping control face 156 on the control edge 150, the pressure plate is pressed down even further and in this manner terminates the clamping between the button 140 and the central limb 134 so that the button is pulled by the spring 142 into its rest position (FIG. 12). Nevertheless, the control abutment 146 holds the pressure plate below the level of the base bars of the slider member so that the pile can be pulled out unimpeded to its full extent. Near to the end of the path of movement the control abutment 146 releases the control edge 150 again; the springs 126 are able to press the pressure plate upwards again at its rear edge whilst at the front it is still held down by the separator 120.

From the above explanations the sequence can be followed again with reference to FIGS. 14 to 17 when a complete pile is to be removed; the positions of the slider member according to FIGS. 14 to 17 are analogous to those of FIGS. 10 to 13.

FIG. 18 shows once again the relative positions of the base bars 114 on the one hand, and the pressure plate 128 on the other hand when the button is in the removal position.

In principle, it would also be possible to return the button into the rest position by means of a control member (not shown) simply during the return of the slider member. However, it may be seen that in the embodiment illustrated there is the advantage that by holding the button firmly in the removal position, the device can be held permanently ready for the removal operation, which is significant in conjunction with the stacking frame which is still to be described, or during dispatching of sensitive pictures.

The operations that are effected by the pressure plate will now be summarised once again.

During picture change-over, the pressure plate is always held straight with the "line" (transversely to the movement of the slider member) adjacent to the bottom-most picture, where the separator runs over. The picture to be retained is consequently clamped reliably where necessary. During the return of the slider member on the other hand the control elements 144 to 150 hold the pressure plate below the level of the base bars of the slider member (or other support means, e.g. on the base plate of the housing) so that the retentive covering 148 does not touch the underside of the pictures.

During the change-over of the pile the pressure plate is brought into the same position as during the change-over return stroke but by means of a button that can be actuated separately. This can be held permanently in the position in which the pile can be changed, but springs back automatically without further manipulation into picture change-over position. It will be seen that in this manner the device is fool-proof.

The pressure plate is so constructed that it also reliably holds fast badly curved pictures and permits the change-over and removal procedure to take place. In order to deal with such "bent" pictures, however, a series of further features is provided in order to prevent incorrect operation.

Pictures that are curved downwards about the transverse axis—at right angles to the direction of movement of the slider member—could lead during the picture change to the top-most or a few of the upper pictures not being pushed backk by the end wall 118 of the slider member but being jammed between the end wall of the slider member and the lid of the housing. For this reason the holding-down lug 124 is provided, beneath which the pictures can be snapped as they are inserted; further possibilities are discussed below.

Pictures that are curved in a reverse direction would not be able to allow the passage of the separator during the change-over process, but would push against this. In this case an especially low-friction material may be used for the separator, and instead of manufacturing the complete slider member in one piece in an injection moulding process, the separator can be attached as a separate part.

Pictures that arch downwards about the longitudinal axis could admittedly lie laterally on the base bars of the slider member during the return stroke of the slider member and in this way remain clear of the retentive covering of the pressure plate, but would push centrally on to the facing edge of the central limbs 132 of the pressure plate. For this reason the relevant edge interrupted by the springs 126 and the auxiliary members 136 is designed to converge to a point, as apparent from FIG. 1. A reverse arching of the pictures would not lead to any disruptions.

Figure 19:
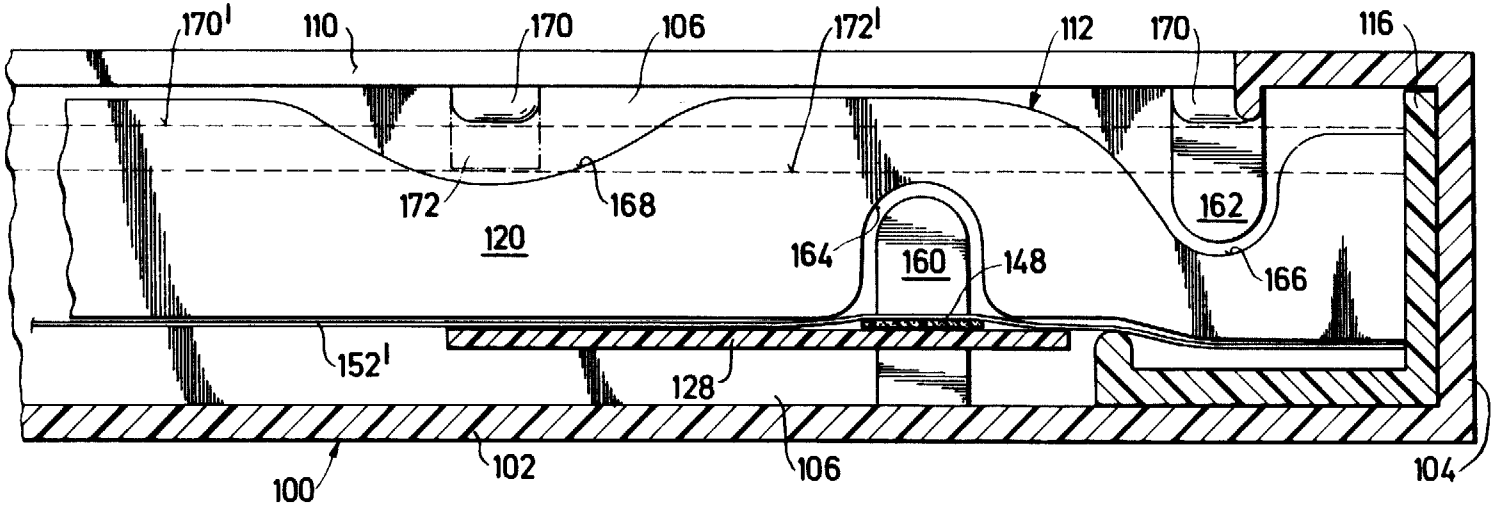
FIG. 19 is a greatly enlarged detail cross-section view on a larger scale than FIG. 18.
Figure 20:
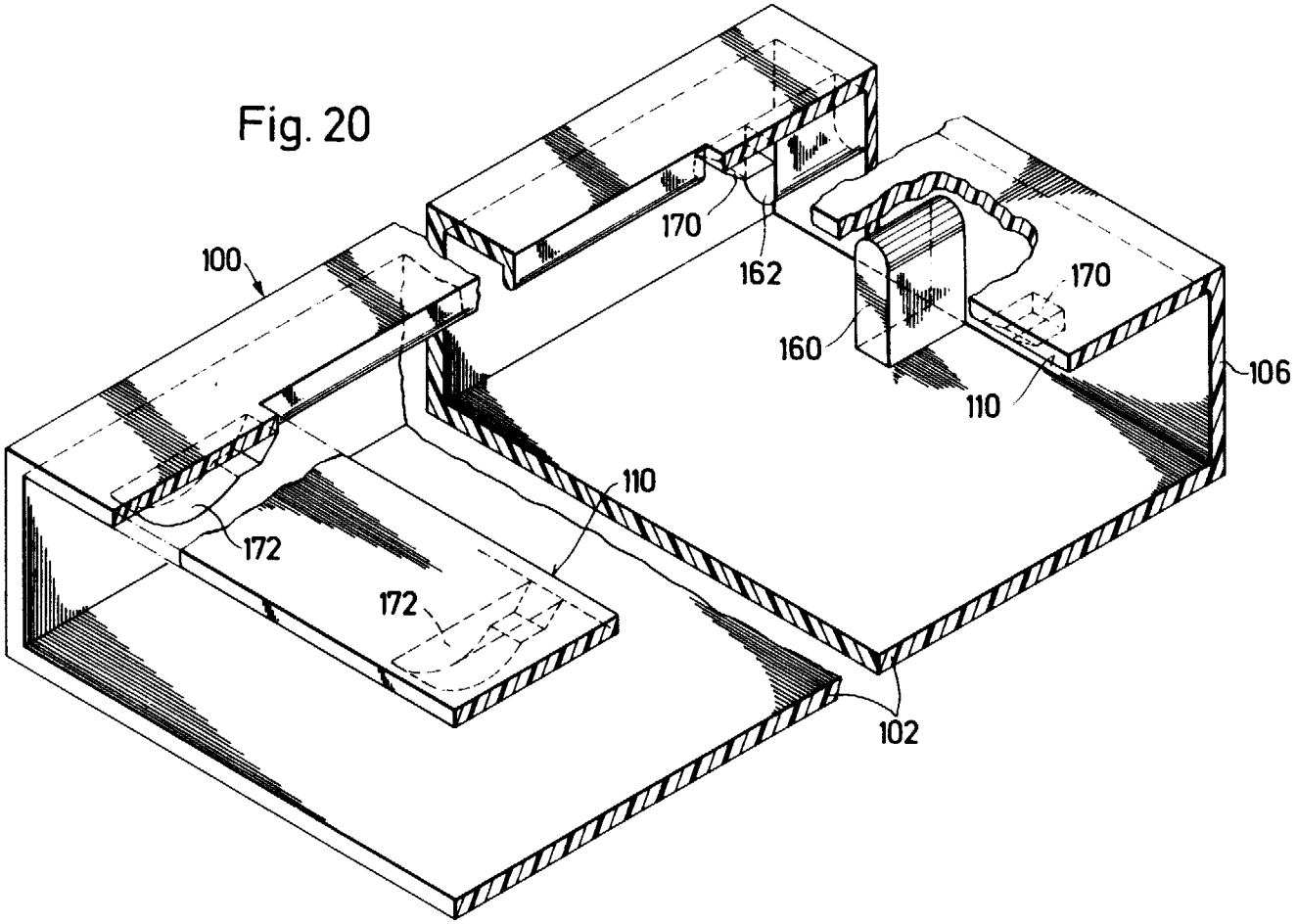
FIG. 20 is a detail perspective view, with portions broken away, of the housing without the slider.

Although the pictures must, of course, lie freely in the slider member, disruptions might occur if the pictures were to lie crookedly. For this reason stop projections 160 and 162 which project from below and from above, respectively, are shaped on the back wall 106 and project to such an extent that they extend into recesses 164 and 166 of the separator 120 when this is in its inner end position (FIG. 19). In this position one projection 160 in each case near to the lateral walls of the housing projects downwards from the lid thereof towards the interior and further inside a projection 162 projects upwards from the base plate towards the interior. In the direction in which the slider member is pulled out the projection is aligned with one of the retentive coverings 148, with the result that the corresponding recess 166 of the separator itself ensures that the separator cannot touch the retentive coverings. A further recess 168, which is formed in the slider member from above leaves room for the passage of holding-down cams 170 which project downwards from the lid and may be more clearly seen in FIG. 20, whilst they have been omitted from the other Figures in order to keep these clear. Their function is to press down the uppermost picture so far below the upper edge of the separator when the slider member has been inserted as to make certain that the slider member takes with it the uppermost picture. Similar holding-down cams that extend further down and are likewise indicated best in FIG. 20 are located near to the front edge of the lid; they have the function of pressing the pile pulled out during the change-over so far below the level of the lower side of the picture 152' lying on the pressure plate that the sliding movement of the picture 152' over the separator is effected as far as possible without any hindrance. In FIG. 19, the upper sides of the pictures are indicated below the cams 170 and 172 by broken lines 170' and 172'.

Finally, it is also apparent from FIG. 19, in which however, this effect has been considerably exaggerated, how the picture held fast on the retentive coverings 148 is stressed by the separator 120 and thereby held so that it clings reliably.

The exact profile of the separator in the transverse direction depends on the type of pictures to be formed into a pile, on the choice of material and other components. A compromise must be made here between the space requirement occasioned by the necessarily inclined attitude of the separator, along which the pressure plate edge must slide at the slider member end, and the firmly held picture must slide at the other end, and an optimum inclination for these faces. For fairly smooth plastics material an angle of about 45° to 60° has proved successful, although this angle need not be constant, as indicated only schematically in FIGS. 2 to 17, but may also vary along the inclined faces or may be different from one face to the other.

FIGS. 21 to 26 show an embodiment in which the separator is arranged in the housing and thus remains in the housing during the picture change of the pile.

The housing 301 accommodates the slider member 305. The spring arrangement 302 which may be disabled externally by means of a button 303 holds the pile against the viewing window 311. As the slider 305 is pulled, the uppermost picture is moved with the transporter on the slider member. The transporter is in this case constructed as a retentive covering 306 which is arranged on the upper long bars 307 of the slider member, at the opposite sides thereof.

Figures 21, 22, 23, 24, 25, 26:
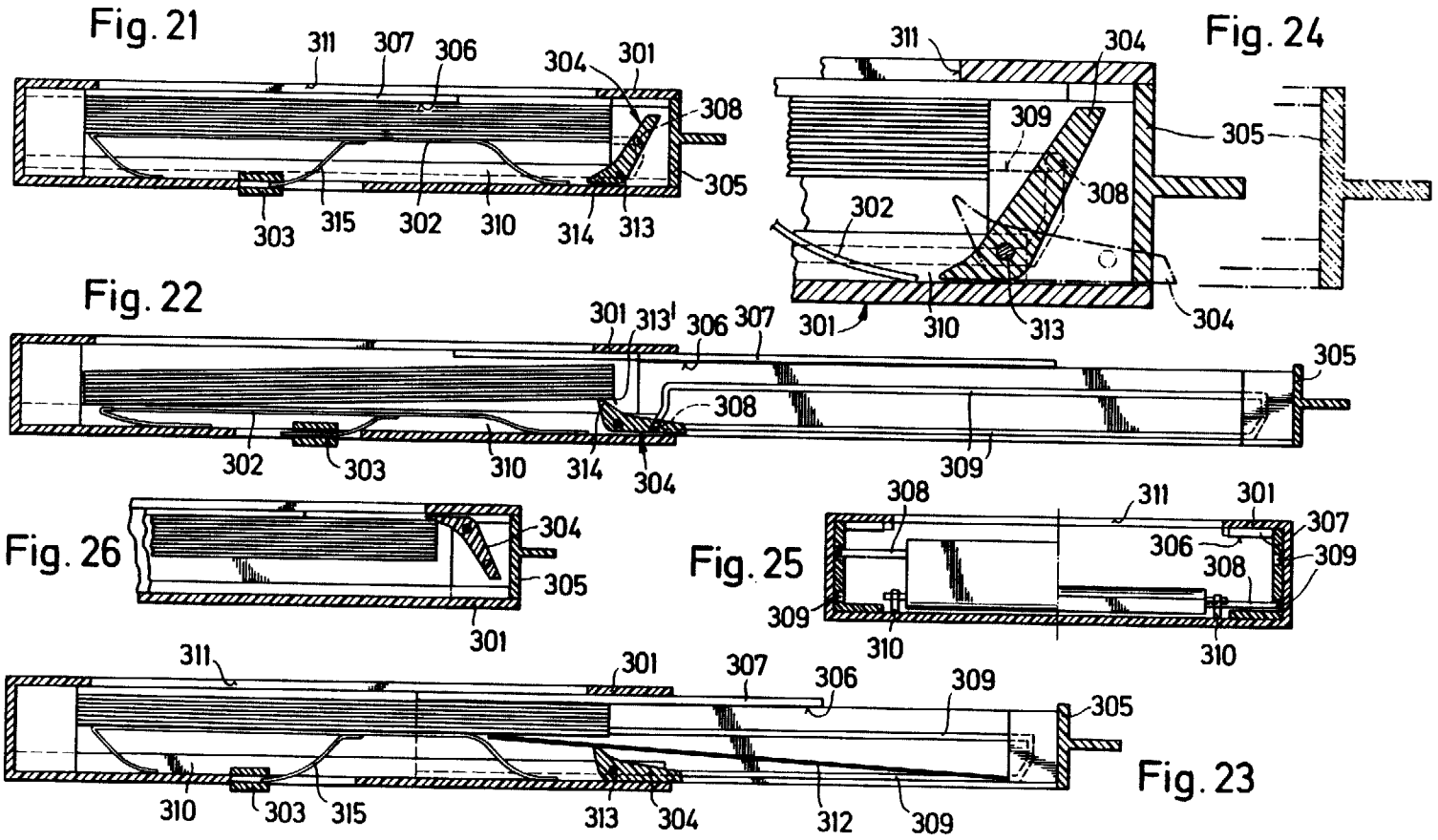

The separator 304 may be pivoted about an axle 313 which is mounted on ribs 310 (see FIG. 25). A pin 308 is located on each side of the separator. These pins are guided in grooves 309 formed in the sides of the slider member and which can be seen to best advantage in FIG. 22.

Only when the uppermost picture is lying completely in the slider member do the guide grooves 309 pivot the separator as the pins 308 follow the angle of the guide grooves. On the return stroke of the slider member, the action of the guide grooves is such that the separator is held in the pivoted state shown in FIG. 22 and only after the slider member has been fully inserted is the separator restored to its original position by a part of the groove that is first inclined and then extends vertically upwards. On the return stroke of the slider member, however, the individual picture 312 that was previously uppermost has passed downwards and is pushed through the gap between the lower front edge 313' of the lowermost picture and a portion 314 of the separator.

It will be seen that in this embodiment it is always the underside of the picture, that is to say, the side facing away from the viewing window 311, that slides over the separator edge, and at any rate during the return stroke there is a sliding contact between the upper side of the picture and the underside of the last picture to the pile. This advantage is not, of course, present in the embodiment according to FIG. 26 in which the bottom-most picture is removed and brought onto the pile again at the top. Attention is invited to that fact that here, the separator 304 is "inverted" with respect to the window.

So that the entire pile may be removed, the button 303 is displaced to the right (FIG. 23) and in so doing presses on the top of an operating spring 315 connected to the spring arrangement 302. For this reason, in the position of the button 303 close to the housing aperture the pressure arrangement is disabled. The pictures now lie loosely in the housing and when, as the slider member is pulled out, the device is held somewhat downwardly inclined towards the slider member, the slider member takes with it the entire pile to the outside. So that the picture can then be more easily removed, the bars 307 do not quite reach to the front end of the slider member or they may alternatively be flexible or be arranged to open up when the slider member is removed.

Figure 27:
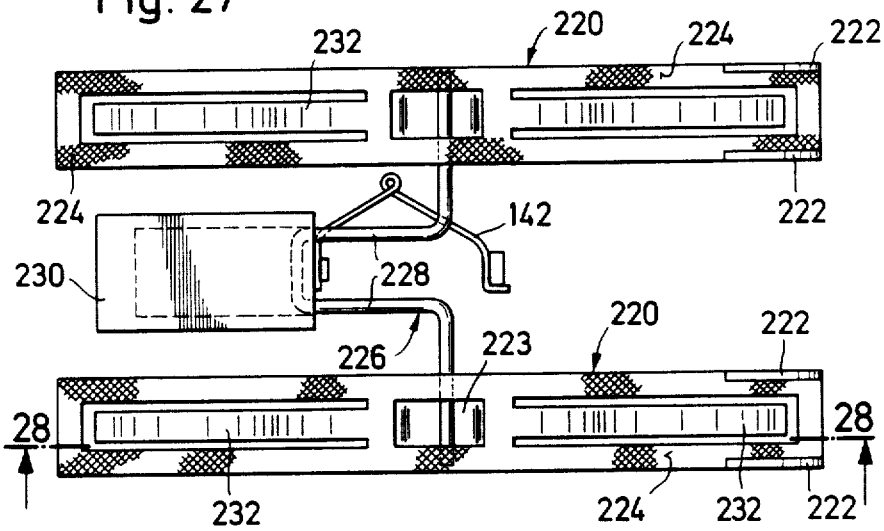
FIGS. 27 and 28 show in plan view and detail section view at 28—28 of FIG. 27, respectively, a modified embodiment of the pressure device as used instead of the pressure apparatus of FIGS. 1 to 20, FIGS. 29 to 31 FIGS. 29-29c illustrate the relationship to a shelving element, and more specifically.
Figure 28:
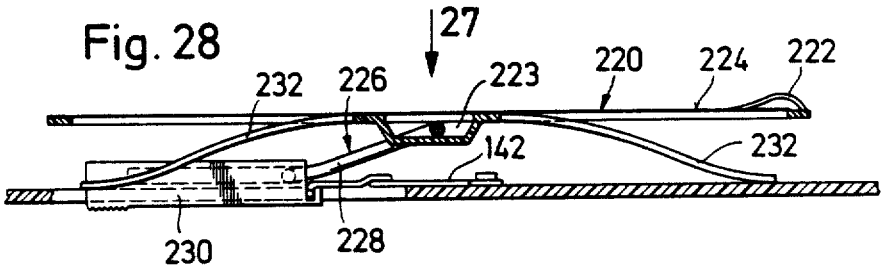

FIGS. 27 and 28 show in schematic plan and longitudinal section, respectively, an example of the construction of the "pressure arrangement" component which may co-operate with the housing and slider member component shown in FIGS. 1 to 20 instead of the pressure arrangement construction shown there.

The pressure plate is divided into two pressure plates 220 of the same construction. Each of them carries two retentive coverings 224 which are indicated by crossed hatching. The auxiliary springs 222 arch out of the pressure plates. On its under side, each pressure plate has a guide means in the form of an elongate slot 223 (see FIG. 28) in which the free outer arms of a doubly cranked wire 226 engage. The U-portion 228 of the wire can be pressed down by a sliding button 230 and thus renders the retentive covering ineffective as explained above, wherein the force of the pressure springs 232 cut out of the pressure plate and bent downwards holds the slider member fast until a release cam (not shown) presses the pressure plates still further downwards so that the button again snaps back into its initial position.

It is obvious that a wide variety of other constructions are possible, for example with wire or leaf springs, pawl- or cam-controlled constructions, constructions that may be pivoted longitudinally or transversely, expansible or rotatable constructions etc.

Furthermore, the rear side—which, in addition to the button, may also be provided with a label for writing on and/or a mounting bracket and/or an eyelet by which the device may be suspended—may carry the instructions for use and operation of the device, with the result that the top face having the window and the four adjoining lateral faces do not show any "technical features" but, on the contrary, do not differ in their external appearance from a conventional picture frame.

Provision may furthermore be made for a spring to be tensioned (or compressed) as the slider is pulled out (or pushed in), the spring then causing the reverse movement to be performed automatically.

Furthermore, especially with the last-mentioned embodiment, a damping member to reduce noise during the change-over process may be provided, for instance tongues or the like formed from the plastics material of which the housing and/or slider member are made.

Finally, the device can be manufactured to match different picture formats, or, alternatively, a single large format can be manufactured and the surplus residual area can be left empty for annotation or other purposes, wherein only the size of the viewing window is varied, etc.

Finally, it should be noted that the picture change can also be effected by a motor, for instance for advertising-display devices or episcope picture viewers.

As only one of many conceivable examples, the text below explains how a stable photograph library arrangement can be built up from devices according to the invention.

Figure 29:
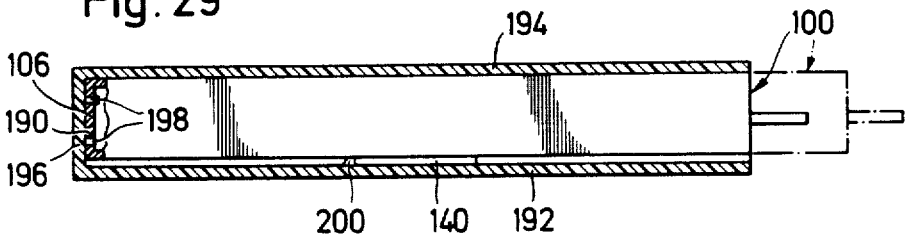
FIG. 29 is a longitudinal section view showing major portions of the picture changer in elevation.

FIG. 29 illustrates one tier of a single or multitiered arrangement in longitudinal section into which the devices shown in FIGS. 1 to 20 may be inserted. The housings 100 have in their back walls 106 in each case one or more holes 190 which are not included in those figures. The tier of the shelf is designed as a case for the housing 100, with a base plate 192, lid 194, back wall 196 and lateral walls that are not visible in FIG. 28. Fixing pegs 198 project from the back wall into the interior in alignment with the holes 190, and the fixing pegs may, as shown in the drawing, also lock positively in the holes. Since a picture change would then be pointless because the uppermost picture would not, of course, be visible, a stub 200 arranged on the base plate of the shelf presses the button 140 into the withdrawal position as the housing 100 is inserted and the button also remains in this position so that when the slider member is pulled out, the entire pile is always brought out with it.

The illustration of FIG. 29 is to be understood as schematic. In practice, there will be a tendency to combine the individual tier elements or shelving elements to blocks, keys and key grooves respectively being provided for this purpose on the outer faces thereof. Alternatively, shelving elements may be provided wherein, in addition to the device-receiving compartments, drawers are provided to receive photo negative strips and/or poor photoprints while the devices themselves house the usable photo prints. Such alternative shelving elements are illustrated in FIGS. 29a–29c.

Figure 29A:
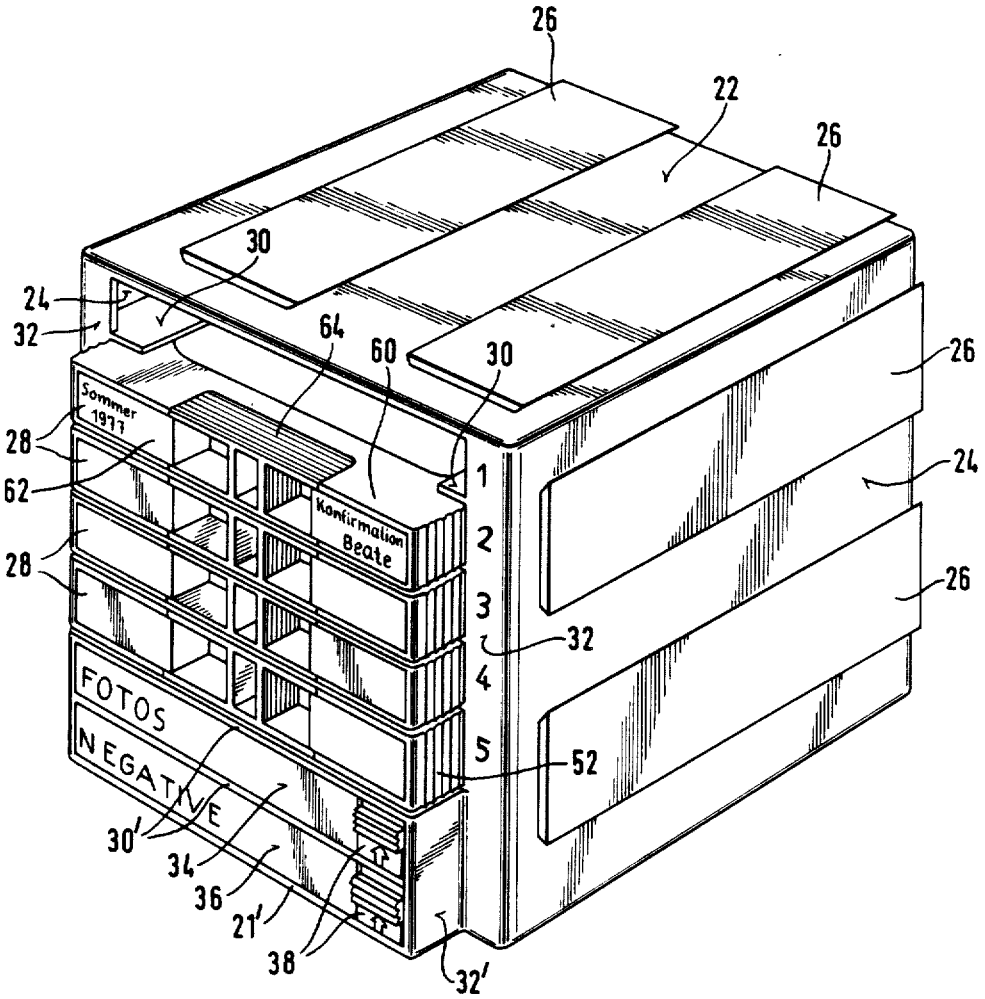
FIG. 29a is a perspective view of another shelving element.
Figure 29B:
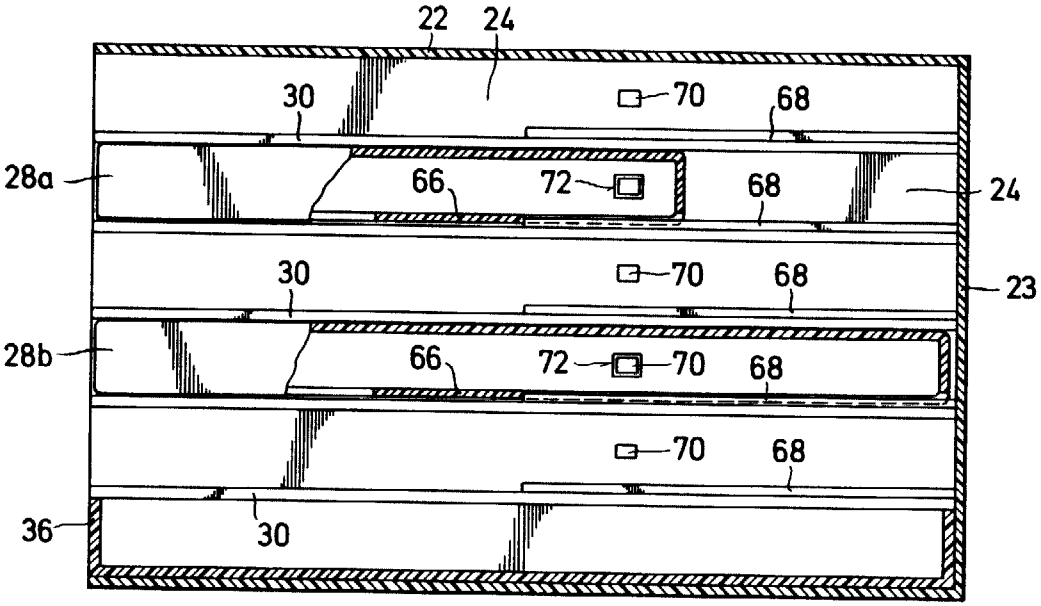
FIG. 29b is a longitudinal section through the shelving element with portions of picture viewers broken away and shown in section.
Figure 29C:
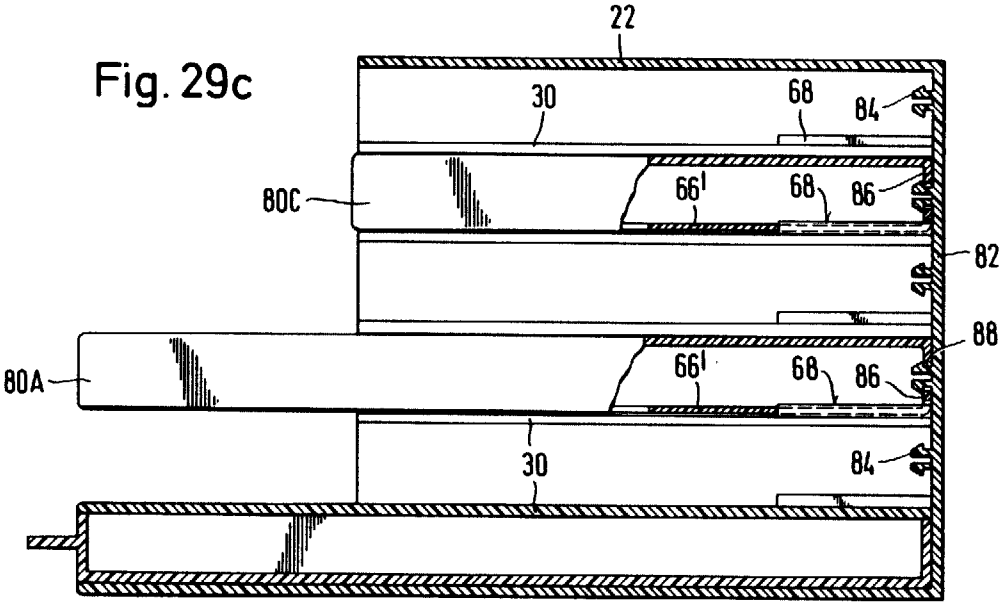
FIG. 29c is a section view through another form of shelving element.
Figure 34:
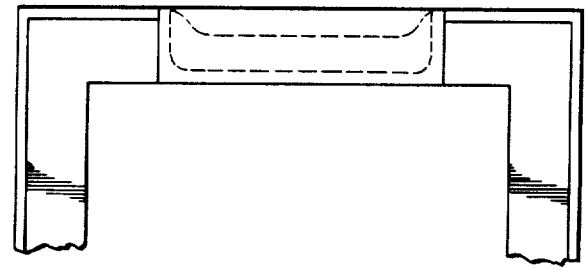
Figure 34A:
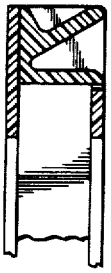
Figure 33:
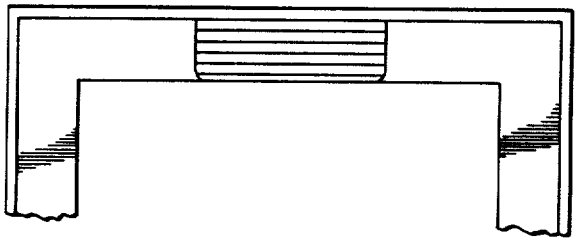
Figure 33A:
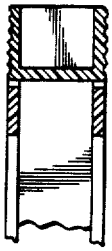
Figure 32:
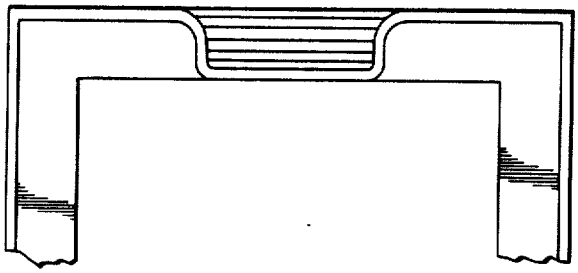
Figure 32A:
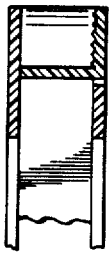
Figure 35:
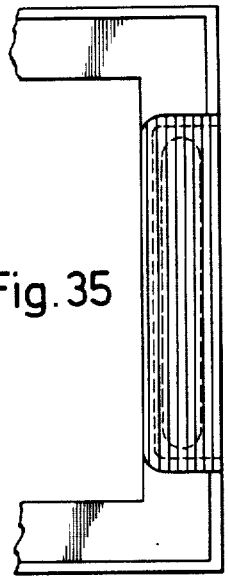
Figure 36:
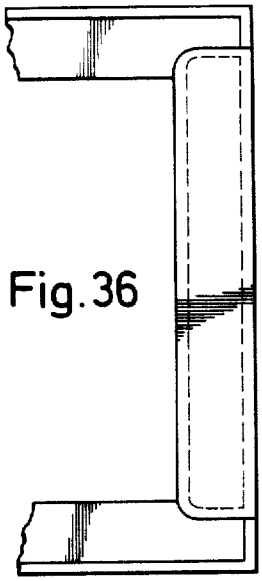

The shelving element shown in FIG. 29a consists of a framework having a top 22, side walls 24 and—not visible in the drawing—a back and a base. The top 22 and the one side wall 24 are provided with projecting ribs 26 of dovetail cross section, whereas the other side wall 24 and the base have grooves shaped in a complementary manner to the ribs; this enables similar shelving elements to be joined together to form blocks.

In the embodiment shown in FIG. 29a, each shelving element has five compartments for the insertion of devices 28. The compartments are separated from one another by lateral ledges 30 that project into the interior of the shelving elements and are somewhat wider than would actually be necessary for accommodating the devices 28, that is to say, they are wider by the width of the front edge sections 32. These edge sections are provided with numbers, in this case from 1 to 5, allocated to the compartments. Their chief function is to ensure that, in the case of shelving blocks combined from several shelving elements, each individual device 28 can still be gripped laterally and pulled out of the shelving element.

There are two drawers 34 and 36 below the five compartments. The uppermost drawer is intended to accommodate duplicates of prints, reject pictures and the like, while the lower drawer is intended and designed to accommodate negatives. The drawers are each provided with a release button 38, on the actuation of which the drawer is ejected by a spring into a position allowing the contents to be easily removed. Stops (not shown) limit the extent of the ejection movement; the construction of such drawers is known per se and is applied to tape cassette containers that are commercially available. In the region of these drawers the edge sections 32, the base and the ledges 30 are each lengthened by projecting portions 32', 21' and the two ledges are supplemented to form complete dividing shelves 30'; the external contours of the framework surrounding the drawers and which is formed in this manner is thus flush with the device 28 slotted in above it into the compartments.

The design of the individual devices is similar to that described above with reference to FIGS. 1–20. Each device comprises a frame or a housing part 60 and a sliding part 62 which may be moved backwards and forwards relative to the housing part by means of a pull 64.

The change-over mechanism of the change-over viewer consists of a spring arrangement which can be rendered ineffective by means of a control button 66 in the housing base which can be displaced in the direction of the movement of the slider member. If the control button is in the position furthest away from the slider pull 64, when the slider member is pulled out and pushed in the pictures change, but if the control button is displaced into the position closest to the slider pull, then the spring arrangement no longer pushes the pile of pictures towards a viewing aperture in the housing, and as the slider member is pulled out the pictures do not change, on the contrary, the entire pile of pictures in the slider member is ejected. In the case of photo prints, it may be desired that these do not lie under spring pressure while being stored, and moreover after the insertion of the device 28 into the shelving element, that the housing 60 remains in the compartment when the pull 64 is pulled but the slider member conveys the prints outwards. This corresponds to the above-mentioned position of the control button closer to the slider pull and provision is therefore made for a control cam provided in the shelving element to urge the control button positively into this position as the device 28 is being inserted into the shelving element compartment; furthermore, it is necessary, or desirable, for the housing 60 to be locked in the compartment in the fully home position.

Change-over viewers will be manufactured only in sizes for a few selected formats of photographic prints, of which the formats "A" (9 cm×13 cm), "B" (9 cm×11.5 cm) and "C" (9 cm×9 cm) have become accepted as the standard formats. The shelving elements and devices of the embodiments illustrated are matched to these dimensions. All devices thus have the same width, corresponding to the measurement of 9 cm, but the change-over viewers at least will be made in the three different lengths, corresponding to the formats "A", "B", and "C".

It is furthermore preferred that the shelving elements shall be constructed to accommodate change-over viewers of all three formats. There are then, in principle, two possibilities:

(1) The depth of the compartments corresponds to the overall length of the change-over viewer for the smallest format "C"; the longer change-over viewers then project forward out of the compartments.

(2) The depth of the compartments corresponds to the overall length of the change-over viewer for the largest format "A", and behind the shorter change-over viewers there is an empty space in the compartment.

Since, on the other hand, each viewer must fit into each compartment, is to be locked there to its housing, and its control button is to be operated by means of the control cam, there is an interaction between the construction of the shelving elements and the construction of the change-over viewer, as will be explained with reference to FIGS. 29b and 29c, respectively.

FIG. 29b is a substantially schematic longitudinal section through a shelving element similar to that shown in FIG. 29a, but here with only one drawer 36 and five compartments. In the second compartment from the top there is inserted a viewer 28a for format "C", and in the fourth compartment from the top a viewer 28b for format "A". It will be seen that from the back 23 of the shelving element control cams 68 project forwards, which cams were struck by the control buttons 66 of the viewers as these were inserted into the compartment, and pushed forwards. The final position of the viewers is thereby determined by small stubs 70 projecting inwards laterally from the sides 24, to which projections there are allocated complementary recesses 72 in the sides of the change-over viewer housing. With this construction, the distance of the control button and the recesses from the front edge of the change-over viewer housing must therefore be the same for all formats.

The alternative design is illustrated in FIG. 29c in a schematicized sectional view, an embodiment of a shelving element for accommodating change-over viewers of different lengths, in which the depth of the compartment is matched to the shortest size of the change-over viewer. The compartments 1 to 5 are, as in the case of the embodiment shown in FIGS. 29a and 29b, intended to accommodate change-over viewers, while below them the shelving element has one compartment having projecting portions of framework and a drawer for negatives.

In the second compartment from the top there is inserted a change-over viewer 80 C, and in the fourth compartment from the top a change-over viewer 80 A. The first projects sufficiently far out of the compartment for its housing to be gripped at the lateral knurled tabs 52, while the latter, in accordance with its longer length, projects further out of the compartment.

As FIG. 29c shows, in this case the change-over viewer housing can be locked by means of fixing pegs 84 projecting towards the inside from the back wall 82 of the shelving element, and the control buttons 66' are, for all change-over viewers, the same distance from the back wall 86 of the housing which is provided with a retaining bore 88 complementary to the head of the fixing peg 84.

It is to be noted that the control cams 68 shown in FIG. 29b and 29c have the shape of rails with a central groove accommodating the spring 142 for control button 140; this detail has not been illustrated in FIGS. 29–29c to simplify the explanation of the shelving elements. It will, alternatively, be also possible to design the devices or the picture viewers without such bias spring 142 for button 140 in which case, consequently, the control cams will be simple bars acting on button 66.

The injection-molding process for plastics is suitable for manufacturing the devices, wherein the housing is, for example, in three parts in order to obtain individual elements that may be easily removed from their molds; the transparent plate covering the viewing window is advantageously manufactured separately so that rectangular, oval or other shapes can be used as desired. Alternatively, instead of a thick, transparent plate, a transparent foil covering the parts of the frame around the viewing aperture can also be glued on from the inside.

The slider member can be injection-molded in one piece and removed from its mold without difficulty.

So that when the device is empty the less aesthetic pressure arrangement is covered over, it may be provided with a glued-on paper covering which exposes only the retentive covering.

The pull on the slider member will not as a general rule be allowed to project forwardly; on the contrary, a construction will be chosen in which it lies flush with a section cut into the end face of the housing. It must be remembered that the housing, measured in draw-out direction of the slider member, is to be dimensioned such that its length is at least equal to the respective length of the pictures in the pile plus twice the dimension of the separator in the same direction; this may readily be derived from FIGS. 1–20. Hence necessarily, the housing must be longer than the pictures, but it is desired that at least space required for the slider handle (which in turn is indispensible) be provided within the confinements of the housing. Moreover, it would be inconvenient to have such or other projections extending beyond the housing contours.

Designs under consideration of the above-mentioned requirements and of problems in connection with manufacture and assembling will now be discussed.

The following figures relate to such design details.

FIGS. 30a and 30b show the housing 100 by itself in longitudinal section.

FIG. 30a shows the simplest design while in FIG. 30b the inner edges 110' near to the viewing aperture are bent inwards so that around the viewing aperture the picture is held lower down and thus an engagement on all sides is achieved.

FIG. 31 shows the construction of the housing from three component parts, one bottom part, one top part and an inserted transparent plate 400, 401 and 402, respectively, being provided. In this manner the parts can be removed without difficulty from single-impression molds.

In the preceding schematic illustrations, the pull on the slider member was an element projecting forwardly. This is aesthetically unsatisfactory and increases the space requirement.

FIGS. 32 to 41 show more satisfactory solutions. In all these cases the front end of the slider member is flush with the front end of the housing and the pull is let into the housing itself. The construction may be seen from the plan views of FIGS. 32, 33, 34, 35, 36 and 37 and from the accompanying cross sections in 32a, 33a, 34a, 35a, 36a and 37a.

Figure 35A:
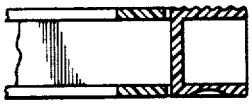
Figure 36A:
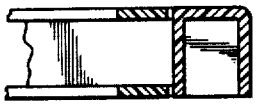
Figure 35B:
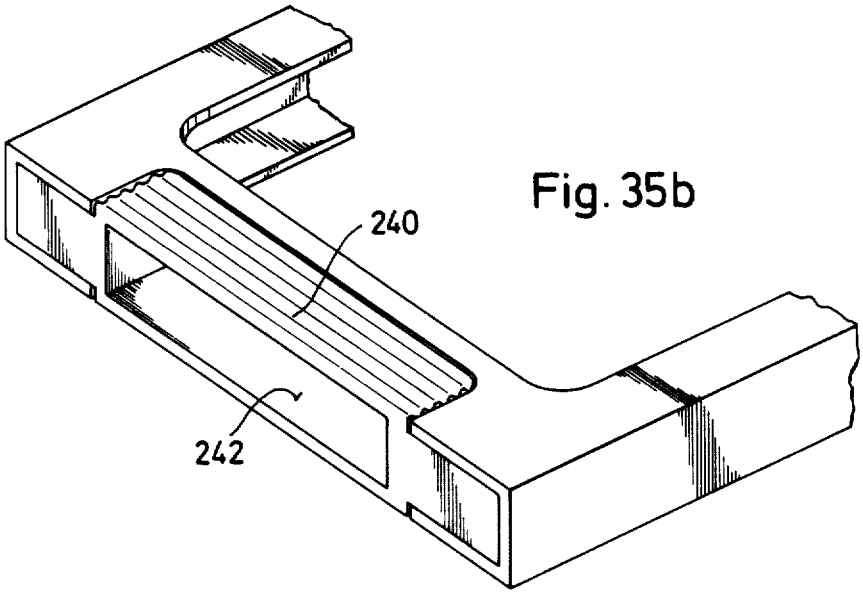

In FIG. 35b the embodiment shown in FIGS. 35, 35a is shown again, this time in perspective, in order to make clear that the pull 240 itself is hollow to ensure thus a uniform wall thickness in all regions of the slider member, as this is more advantageous in injection-molding engineering. This recess 242, which then appears at the front of the slider member, can be used to accommodate labels 244 for inscription in accordance with FIGS. 39 to 41.

Figure 37:
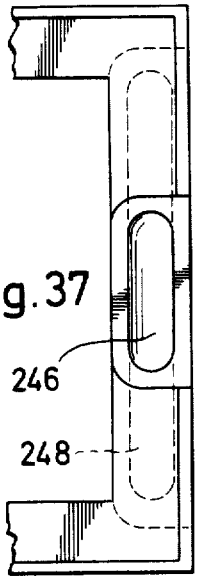
Figure 37A:
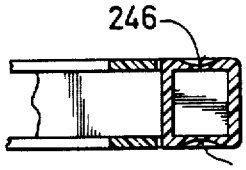

In the embodiment shown in FIGS. 37 and 37a, at the top of the pull there is a short depression 246 for the thumb tip and underneath the grip there is a longer depression for the remaining finger tips. Instead of pushing the label carriers into the recess centrally at the front of the slider pull, the areas to the right and left of the slider member may also be designed so that they can be written on.

Figure 43:
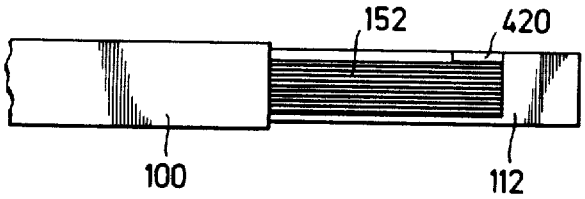
Figure 44:
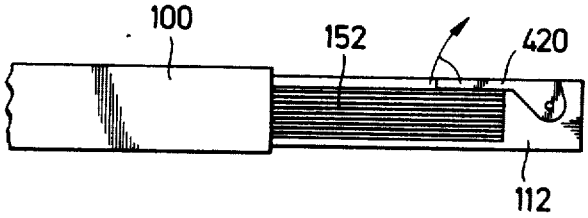
Figure 45:
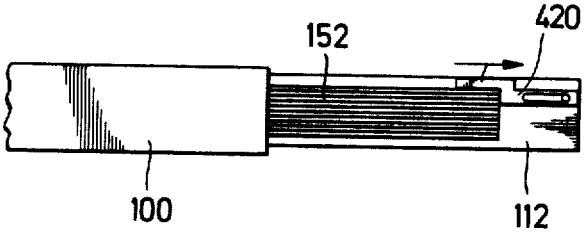
Figure 46:
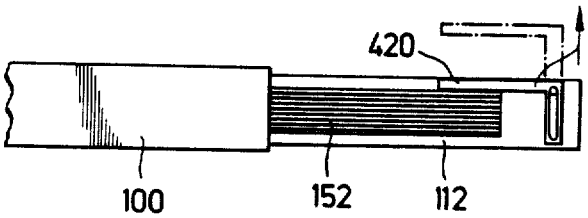
Figure 47:
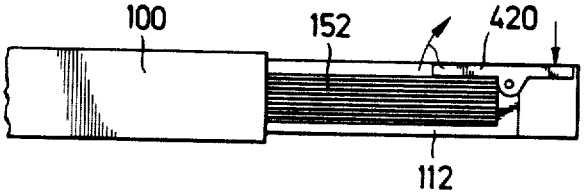

FIG. 42 shows in plan view recesses 410 near to the ends of the lateral parts of the slider member nearest the pull; these lateral parts enable the pile of pictures that has been inserted to be gripped at the side with two fingers. Alternatively, the pictures may also be pressed from below through the slider member aperture towards the outside. In this process the pictures lie against the stop 420 holding down the pictures from above (FIG. 43), so that it is advisable, to facilitate operation, to be able to move this hold-down stop aside in some manner or other. This may be effected by means of hinge-back elements (FIG. 44), slide-away parts (FIG. 45), pull-out elements (FIG. 46) or lever-like parts (FIG. 47); in these figures the arrow indicates in which direction the movement away occurs. According to FIG. 48, this hold-down stop may also be pulled away laterally for a distance over the longitudinal edges of the picture.

It may be advisable to manufacture the separator from a particularly low-friction material; however, it would be uneconomical to manufacture the complete slider member or the complete housing from such a material. FIG. 49 shows how this may be avoided by attaching the separator 430 to the corresponding lateral limbs of the slider member of the housing 432 by means of pins 434.

As shown in FIG. 50, it is possible to manufacture by an injection moulding process the top closure lid together with the housing, the lid having a pull that is open at the top and has a U-shaped profile. After moulding the joining bars 440 may then be punched through and the pull can be placed on the inserted and subsequently centered slider member.

FIG. 51 shows at 460 and 462, respectively, tongues shaped on the housing (see also FIGS. 52a to 52c) which, then the slider member is inserted for the first time over their sloping faces 464, move resiliently outwards, but when the slider member is pulled out again do not move resiliently outwards because a stop 466 on the slider member runs against the co-operating vertically extending face 468.

What is claimed is:

1. A picture viewer for a pile of pictures, comprising enclosure means including a frame defining a viewing window and a slider reciprocably mounted on the frame, the frame and slider having relative obverse and reverse sliding movements is opposite directions along the window, the enclosure means also defining a picture compartment having one end adjacent the window to contain a pile of pictures with a picture at one end disposed at said one end of the compartment and adjacent the window, a picture changing mechanism adjacent the picture compartment for removing an individual picture from one end of the pile and returning the individual picture to the other end of the pile in response to said relative obverse and reverse sliding movements of the frame and slider to present a new picture at the window for display, said picture changing mechanism including a pile transporter and an individual picture transporter, one of the transporters being connected with the frame and movable therewith and the other of the transporters being connected with the slider and movable therewith, the pile transporter being disposed at one side of the compartment to engage one side of the pile of pictures, the picture transporter being disposed at one end of the compartment to engage such an individual picture at the corresponding end of the pile of pictures, the transporters producing relative movement of the pile of pictures and of the individual picture during changing of the picture at the window, one of the transporters having controllable means operable between alternate functional and non-functional conditions to produce said relative movement when rendered functional, and a disabling means including a disabling control movably mounted on the enclosure means at the exterior thereof, said disabling control having connection with the controllable means of said one transporter for rendering said one transporter non-functional for producing the relative movement in response to movement of the disabling control at the exterior of the enclosure means.

2. The picture viewer according to claim 1 and the controllable means of said individual picture transporter including pressure means on the enclosure means and applying pressure on the pile of pictures toward one end of the compartment, and said disabling control having connection with said pressure means for relieving the application of pressure against the pictures in response to movement of the disabling control relative to the enclosure means.

3. The picture viewer according to claim 2 wherein the pressure means confronts and applies pressure toward the window to urge the pile of pictures against the window, and the disabling control withdrawing the pressure means in a direction away from the window.

4. The picture viewer according to claim 2 and the pressure means including a retentive element facing into the compartment to engage a picture at the end of the pile therein, said retentive element normally engaging a face of an individual picture in the pile to strip such picture off the pile during such relative obverse sliding movement between frame and slider.

5. The picture viewer according to claim 2 and including additional disabling means disabling said individual picture transporter in response to said relative reverse sliding movement between frame and slider.

6. The picture viewer according to claim 2 and the pressure means including a leaf spring anchored on the enclosure means and applying such pressure on the pile of pictures, and the disabling control being operatively connected with the leaf spring for withdrawing the leaf spring away from the compartment and relieving the pressure applied to the pictures.

7. The picture viewer according to claim 6 wherein said leaf spring is formed of metal material.

8. The picture viewer according to claim 6 and the leaf spring and the disabling control having a binding frictional relationship therebetween to frictionally retain the leaf spring in its withdrawn position relieving pressure from the picture.

9. The picture viewer according to claim 8 wherein the disabling control is mounted on the frame and means on the slider for returning the disabling control to rest position.

10. The picture viewer according to claim 8 and an auxiliary spring to return the disabling control to rest position.

11. The picture viewer according to claim 8 wherein the leaf spring is pivotally mounted to turn about an axis perpendicular to the direction of sliding movement between frame and slider.

12. The picture viewer according to claim 1 wherein the pile transporter includes a separator bar traversing and obstructing said one side of the compartment to engage the side of the pile of pictures, said separator bar being shiftable out of traversing and obstructing relation to one side of the compartment, and said disabling control being connected with said separator bar to alternately move the separator bar out of obstructing relation and returning the bar into obstructing relation at the side of the compartment to permit disabling of the pile transporter.

13. The picture viewer according to claim 12 wherein the separator bar is pivotable out of and into traversing and obstructing relation to said one side of the compartment, and said disabling control effecting swinging of the separator bar for disabling the pile transporter.

14. The picture viewer according to claim 1 wherein said individual picture transporter has picture engaging means movable endwise of the compartment to be withdrawn away from the compartment and the pile of pictures therein, and said disabling means having connection with said picture engaging means for withdrawing the picture engaging means out of engagement with a picture in the pile.

15. The picture viewer according to claim 1 wherein said disabling control is slidable on the enclosure means between a rest position and a disabling position, the disabling means disabling said one transporter in the disabling position of the control and permitting operation of the transporters for changing pictures in the rest position of said disabling control.

16. The picture viewer according to claim 1 and said disabling control being movable between rest position and disabling position, the disabling control rendering the transporter inoperative in disabling position and allowing normal operation of the transporter in said rest position, and means responsive to relative reverse sliding movement between frame and slider and engaging the disabling control to return the disabling control from disabling position to rest position.

17. The picture viewer according to claim 1 wherein the frame embraces the slider and the slider has a handle within the confining contours of the housing.

18. The picture viewer according to claim 17 and the frame defining a wall at the end of the compartment, the wall having a recess adjacent the slider handle and the slider handle having a shape complementary to the contour of the recess.

19. The picture viewer according to claim 18 wherein the handle is hollow and has a label carrier thereon.

20. The picture viewer according to claim 18 and [the handle being] *including pile hold down means* on the slider [but] *and* movable with respect to the slider into [an] *and* out of *an* operating [condition] *position.*

21. Storing and viewing apparatus for a pile of pictures, comprising a shelving element having an open-ended housing compartment, a picture viewer in one of said compartments and being removable therefrom, the picture viewer having enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture on one end of the pile disposed at said one end of the compartment and adjacent the window, a picture changing mechanism adjacent the picture compartment for removing an individual picture from one end of the pile and returning the individual picture to the other end of the pile in response to said relative obverse and reverse sliding movements of the frame and slider to present a new picture at the window for display, said picture changing mechanism including a pile transporter and an individual transporter, one of the transporters being connected with the frame and movable therewith and the other of the transporters being connected with the slider and movable therewith, the pile transporter being disposed at one side of the compartment to engage one side of the pile of pictures, the individual picture transporter being disposed at one end of the compartment to engage such an individual picture at the corresponding end of the pile of pictures, and the individual picture transporter including pressure means applying pressure on the pile of pictures toward one end of the compartment, the transporters producing relative movement of the pile of pictures and of the individual picture during changing of the picture at the window, disabling means including a disabling control movably mounted on the enclosure means at the exterior thereof, said disabling control having connection with the pressure means for relieving the application of pressure against the pictures and rendering said individual picture transporter inoperative in response to movement of the disabling control at the exterior of the enclosure means, and said shelving element having operating means engaging and moving the disabling control relative to the enclosure means during insertion of the picture viewer into the housing compartment for disabling the picture-changing mechanism and relieving pressure from the pictures upon insertion of the viewer into the compartment of the shelving element.

22. The picture viewer according to claim 21 and the individual picture transporter including pressure means on the enclosure means and applying pressure to the pile of pictures in the compartment, and said disabling control having connection with the pressure means of the individual picture transporter to relieve the pressure on the pictures and render the individual transporter inoperative in response to insertion of the viewer into the compartment of the shelving element.

23. The storing and viewing apparatus according to claim 21 and the enclosure means of the viewer being slidable longitudinally into the housing compartment, the disabling control being slidable longitudinally of the enclosure means for rendering the one transporter inoperative, and stop means on the shelving element adjacent the housing compartment and engaging the disabling control during insertion of the viewer to produce longitudinal sliding movement of the disabling control during such insertion.

* * * * *